UNITED STATES PATENT OFFICE.

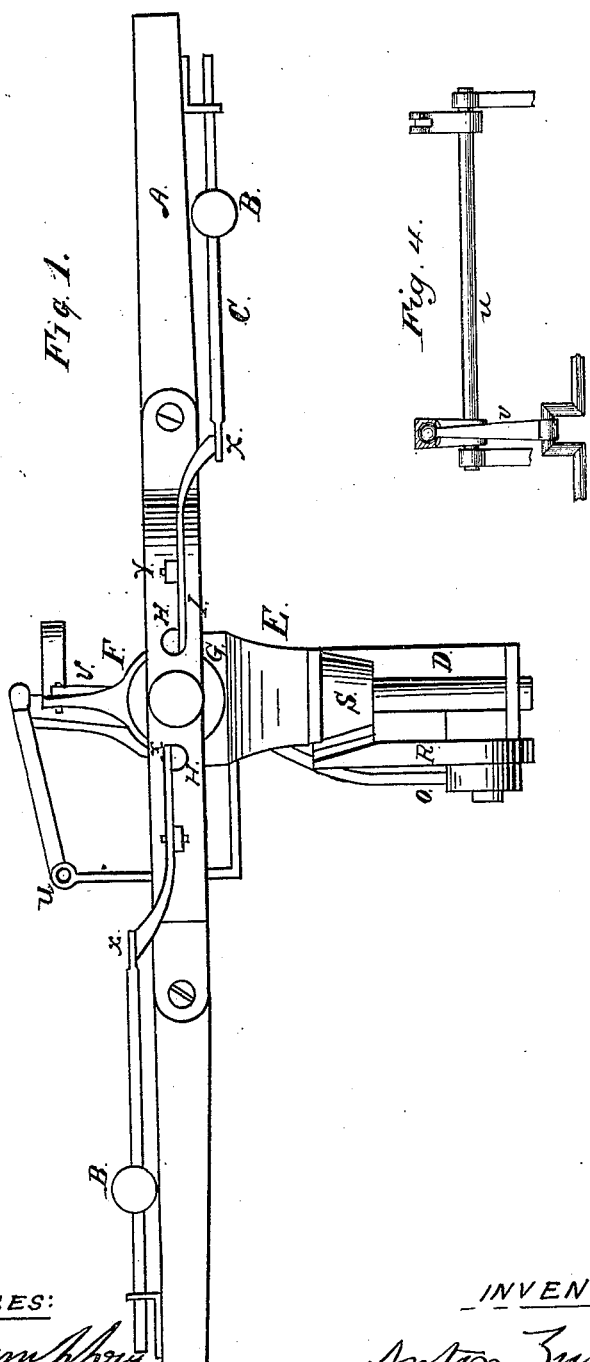
A. ZWIEBEL.
Wind-Engine.
No. 205,780.    Patented July 9, 1878.

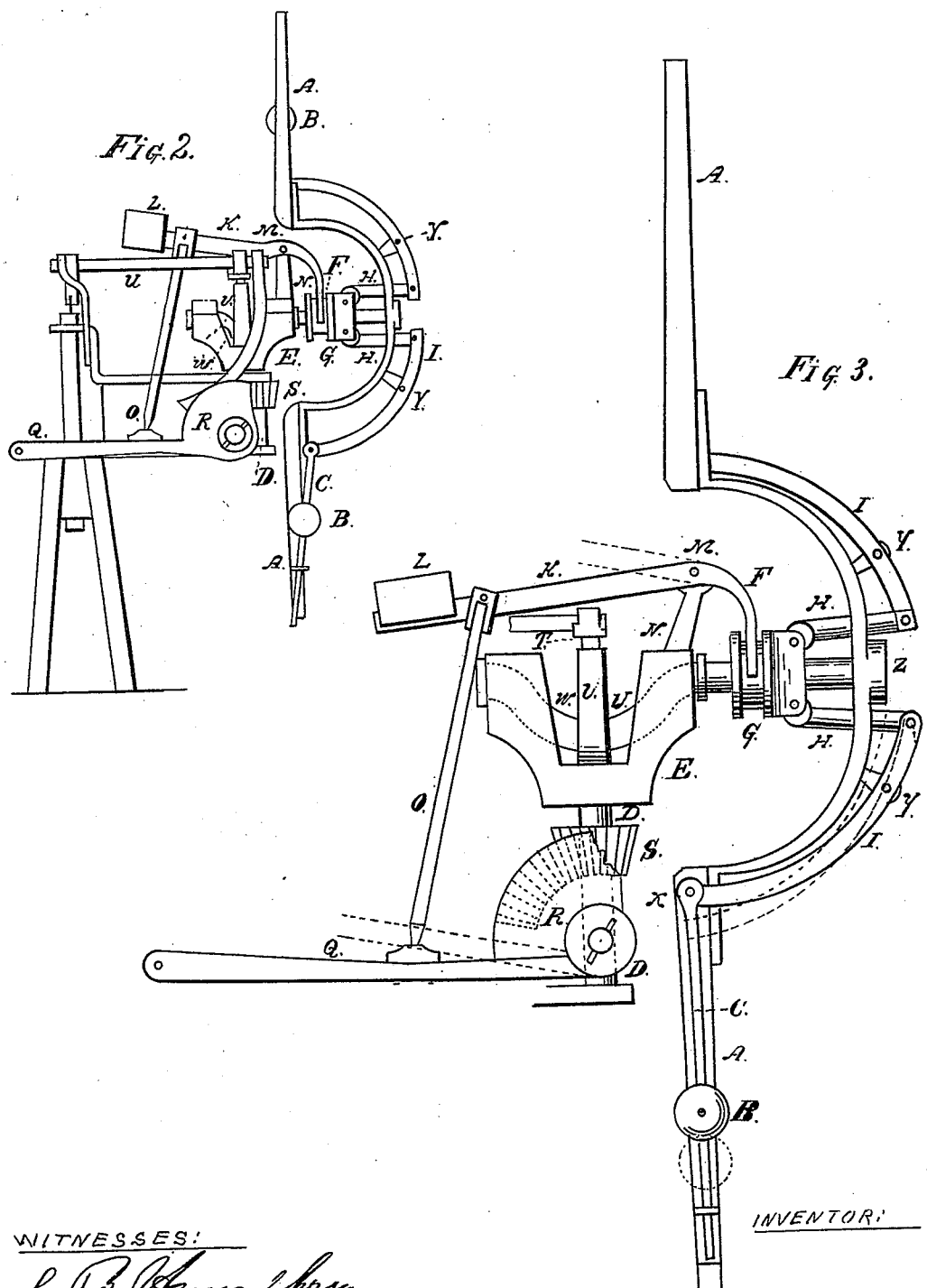

ANTON ZWIEBEL, OF BURLINGTON, WISCONSIN.

IMPROVEMENT IN WIND-ENGINES.

Specification forming part of Letters Patent No. 205,780, dated July 9, 1878; application filed February 8, 1878.

*To all whom it may concern:*

Be it known that I, ANTON ZWIEBEL, of Burlington, in the county of Racine, in the State of Wisconsin, have invented certain Improvements in Wind-Wheels, of which the following is a specification:

My invention has for its object a complete and easy mode of governing a wind-wheel, so that when the wind blows so hard as to give the wheel too much motion the wheel will be turned edgewise to the wind, and thus the motion will be slackened, with several other improvements, which will be described further on.

In the drawings, forming part of this specification, Figure 1 is an end view of the invention from the rear of the same. Fig. 2 is a side view of the same, and Fig. 3 a view of the other side of the same. Fig. 4 is a view of a ball-and-socket joint, which connects the upper end of a pitman with a lever from a rocker-shaft.

A A are two arms, on which the wheel rests; B B, the balls on the arms of the wheel, which govern the same; C, the arms on which the balls operate; D, the shaft on which the wheel turns edgewise to the wind; E, the pillow-block, in which the running-shaft is sustained; F, a clutch, which catches in a groove in block G, to which are secured arms H, which are attached to arms I. When the balls B are thrown out they pull on arms I and throw in block G, pushing clutch F back, and raising the arm K with weight L on the end of it. This arm K and weight L are raised by the clutch F being thrown forward and pushing the arm K against fulcrum M on a standard, N, the end of arm K, with which the clutch engages, being bent down. The arm K, pulling on connecting-rod O, attached at its lower end to lever Q, raises lever Q, turning segment R, which, with cogs on it, meshes into wheel S on shaft D, which, as the lever Q is raised, turns the wind-wheel round edgewise to the wind.

T is a lever, running out from rocker-shaft U, and attached to a pitman, V, by a ball-and-socket joint, the other end of the pitman attached to the crank W on the main driving-shaft, which, as the wheel revolves, rocks the rocking shaft U, which has a lever on the other end of it, to which is attached anything to be operated. The arms I are flexible by means of a joint, X, in the same, and a fulcrum, Y, at the inner ends of arms I, to which are attached arms H, which are shoved backward and forward as the balls B move out and in, carrying the ends of arms C with them, pushing and pulling on the joint X, and thus operating that part of the arm pivoted on fulcrum Y.

Z is a shaft, on which the wheel turns as the wind may shift. This wheel has no vane to keep it to the wind, the wheel being placed in rear of the tower, at a point where a line drawn from the center of the tower will strike the center of the wheel, and as the wind blows the wheel will be kept facing it.

What I claim as new, and desire to secure by Letters Patent, is—

1. In combination with a wind-wheel shaft, a rocker-shaft, extending out in the same direction therewith, and a lever connecting said rocker-shaft to a pitman by ball-and-socket joint, said pitman being connected to the crank on the main driving-shaft, so that by means of the ball-and-socket joint the rocker-shaft may remain in position when the wheel is turned edgewise to the wind, substantially as described.

2. Balls B, arm I, clutch F, block G, arm K, connecting-rod O, lever Q, segment-wheel R, meshing into wheel S, in combination with shaft D, substantially as and for the purpose described.

ANTON ZWIEBEL.

Witnesses:
J. B. SMITH,
C. A. BROWNSON.